A. JUDE & R. K. MORCOM.
TURBINE.
APPLICATION FILED MAY 10, 1907.

900,739.

Patented Oct. 13, 1908.
3 SHEETS—SHEET 1.

WITNESSES
W. P. Burk
W. J. Smith

INVENTORS
Alexander Jude
Reginald Keble Morcom

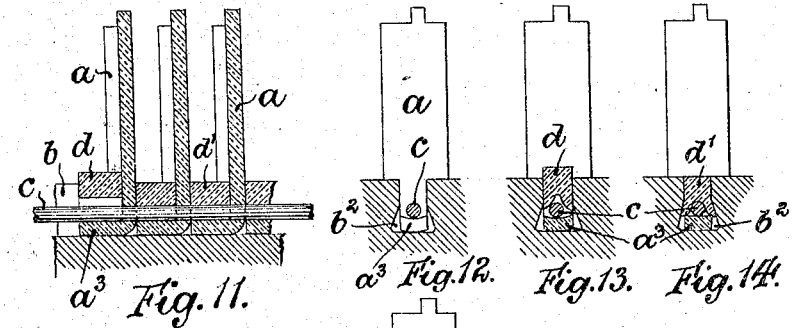
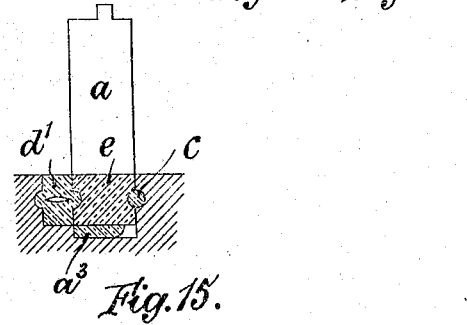
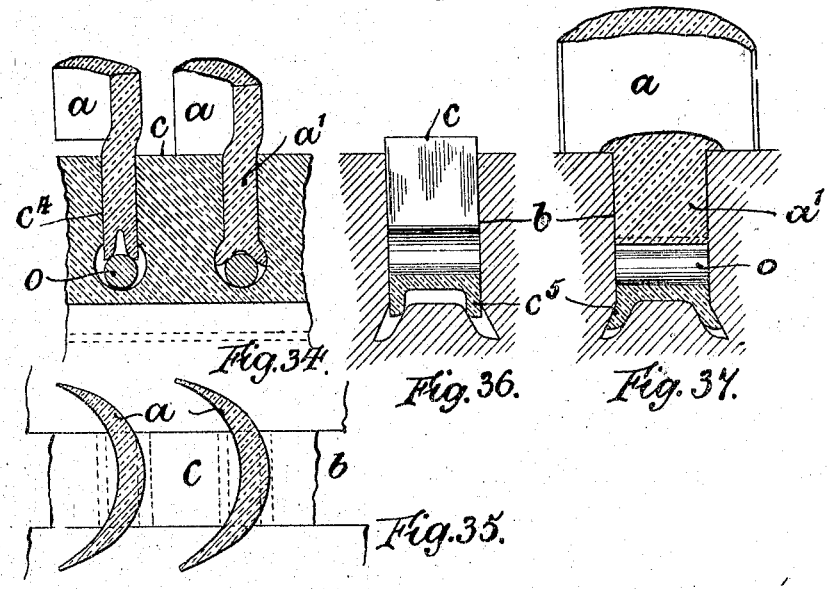

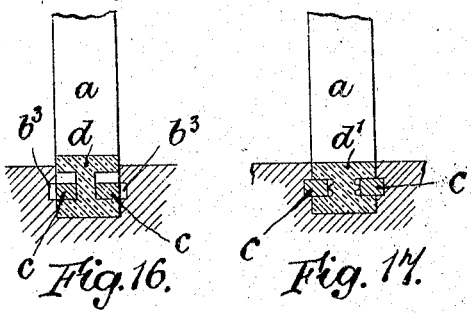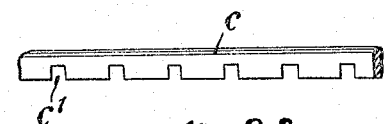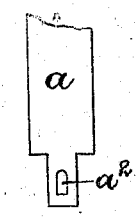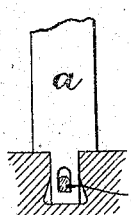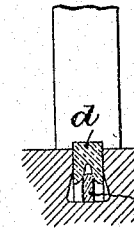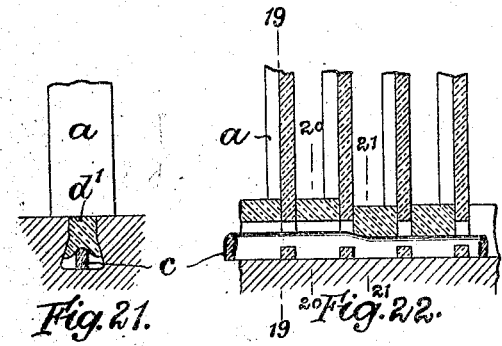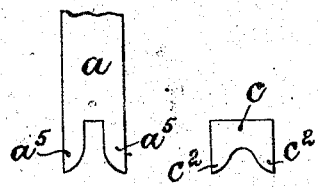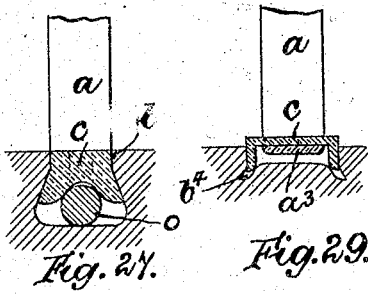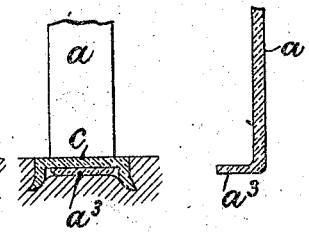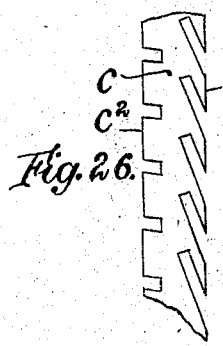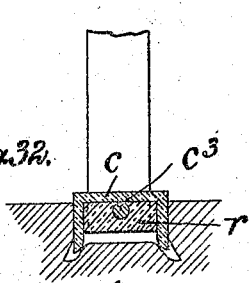

UNITED STATES PATENT OFFICE.

ALEXANDER JUDE AND REGINALD KEBLE MORCOM, OF BIRMINGHAM, ENGLAND, ASSIGNORS TO BELLISS & MORCOM LIMITED, OF BIRMINGHAM, ENGLAND.

TURBINE.

No. 900,732.

Specification of Letters Patent.

Patented Oct. 13, 1908.

Application filed May 10, 1907. Serial No. 372,974.

*To all whom it may concern:*

Be it known that we, ALEXANDER JUDE and REGINALD KEBLE MORCOM, subjects of the King of Great Britain, residing at Ledsam Street Works, Birmingham, county of Warwick, England, have invented new and useful Improvements in Turbines, of which the following is a specification.

This invention relates to improvements in the construction of guide-blades and vanes for turbine motors and to means for assembling and securing them to the stators and rotors respectively.

The principle of connection involves the employment of a groove with undercut sides formed in the stator or rotor, or attachments forming portions thereof, and such a form of construction of the shanks of the guide-blades or vanes which are inserted in the groove, and of distance pieces, that after assembling them on a stringer device, which may be a wire or rod on which or a perforated strip through which they are threaded, and on forcing the assembled elements into the groove they are distorted to occupy the underlying space of the groove and thus become secured therein.

In the accompanying drawings are shown examples of guide-blades or vanes secured or in course of being secured according to the present invention.

Figures 1, 2, 3, 4, 5, 6:
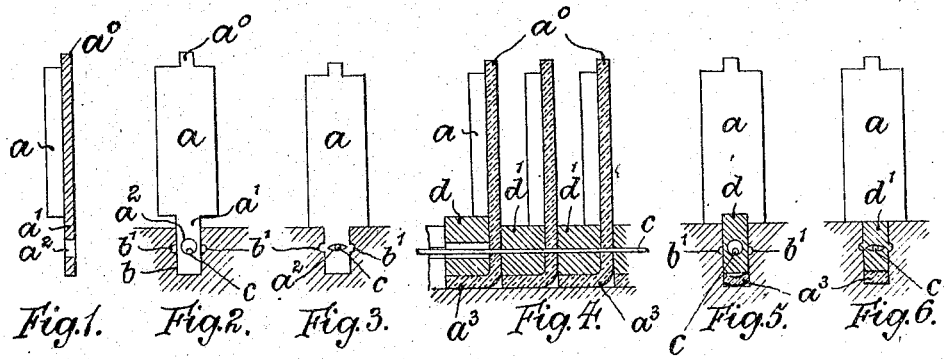

In these drawings:—Figures 1–6 show one method of securing:—Fig. 1, being a section side elevation, Figs. 2 and 3 transverse sections, Fig. 4 a longitudinal section, and Figs. 5 and 6 transverse sections. Figs. 7–10 show another method:—Fig. 7 being a longitudinal section, and Figs. 8–10 transverse sections. Figs. 11–14 show a further method:—Fig. 11 being a longitudinal section, and Figs. 12–14 transverse sections. Fig. 15 shows a further modification. Figs. 16 and 17 are transverse sections showing another method. Figs. 18–23 show a still further method:—Figs. 18–21 being transverse sections, and Fig. 22 a longitudinal section. Fig. 23 is a side elevation of a detail. Figs. 24–28 show a further method:—Fig. 24 being a front elevation of a guide-blade or vane, Fig. 25 a transverse section of a stringer, Fig. 26 a plan thereof, Fig. 27 a transverse section of the assembled elements, and Fig. 28 a sectional plan thereof. Figs. 29–32 show another method:—Figs. 29 and 30 being transverse sections, Fig. 31 a vertical section of a guide-blade or vane, and:—Fig. 32 a plan of a stringer. Fig. 33 is a transverse section showing an alternative method. Figs. 34–37 show a still further alternative method:—Fig. 34 being a longitudinal section, Fig. 35 a plan, and Figs. 36 and 37 transverse sections.

According to Figs. 1 to 3 $a$ is a guide-blade or vane, the shank $a^1$ of which is inserted in the groove $b$ preparatory to effecting the securing operation. Through the shank a hole $a^2$ is bored and in the sides of the groove $b$ undercut recesses $b^1$ $b^1$ are formed. On subjecting the blade or vane to a crushing force the comparatively weak sides of the hole $a^2$ will yield by bulging outwards and filling the recesses $b^1$ $b^1$, the vertical dimension of the hole $a^2$ being reduced as shown in Fig. 3. A wire stringer $c$ is threaded through the holes $a^2$ to connect together the adjacent blades and vanes. The spaces between the blades or vanes may be occupied by distance pieces formed with a perforated section like that of the shank above described. By forming the blades or vanes with a foot $a^3$ made integrally with the shank by bending, as shown in Figs. 4–6, the insertion of distance pieces $d$ which, on being crushed, take the modified form $d^1$, the blades or vanes will be directly retained by the distance pieces. If the hole in the shank of the blade or vane be crushed as well as the hole in the distance piece, the hold fast will be due partly to the distortion of the shank and partly to the distorted distance piece which is above the foot $a^3$ and which is also connected to the shank by the stringer $c$.

Figures 7, 8, 9, 10:
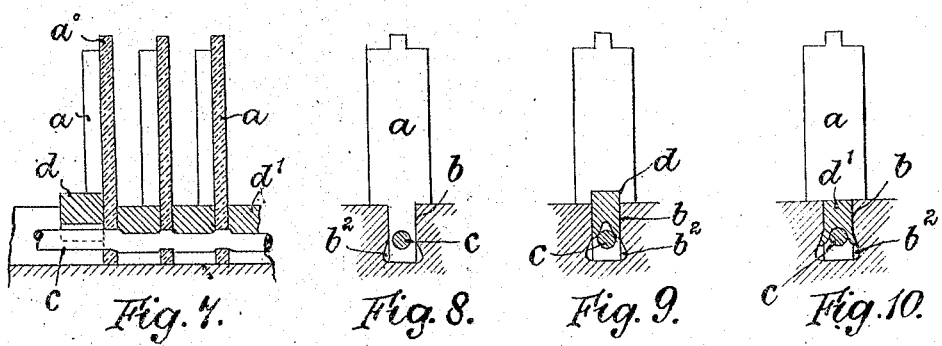

In Figs. 7–10 is shown a modification in which a stringer rod $c$ is likewise threaded through the holes $a^2$ formed in the shanks of the blades or vanes, the retention however being effected by bifurcated distance pieces $d$ which, in Fig. 10 and on the right in Fig. 7, are shown in the crushed condition $d^1$ with the fangs diverted by the stringer and the undercut recesses $b^2$ $b^2$ of the groove $b$. The crushing of the distance pieces causes some bending of the stringer unless it is supported by the previous insertion of a detached piece but:—As shown in Figs. 11–14, the stringer may be supported by the bent foot $a^3$ of the shank of the guide-blade or vane and thus its retention will be assured by the combined effect of the stringer, foot and distance piece. By means of the stringer immersed in the groove the guide-blades and vanes will be secured to one another as well as to the stator and rotor respectively and thus a continuity of connection will be provided in addition to that derived from the shrouding-piece which is secured to the lugs $a^0$ (Figs. 1-6) by riveting in the known manner.

Fig. 15 shows a further variation in means for securing guide-blades and vanes formed with a foot $a^3$. In this figure the groove is made wide enough to receive, on one side of the guide-blade or vane, a block $d$ bored like the distance piece $d$ shown in Fig. 5, the sides of the groove being recessed as in Fig. 5. Between consecutive blades or vanes and over the feet thereof, blocks $e$ are inserted, having grooves formed in their sides, and when the side blocks are crushed as shown at $d^1$ in Fig. 15, the blades or vanes will be secured chiefly through the medium of the blocks $e$ but partially by the distorted portion of the blocks $d^1$ entering the notches formed in the edges of the shanks of the guide-blades and vanes. On the other side of the guide-blade or vane a stringer $c$ is employed, the stringer being half immersed in a side recess of the ring groove and half in the notches formed in the shanks and intermediate retaining blocks $e$.

Figs. 16 and 17 show how blades and vanes, the edges of the shanks of which are notched, can be secured by means of side stringers and distance pieces of I section. Fig. 16 shows the vane $a$, the two stringers $c\ c$ and the block $d$ assembled within a groove, provided with a secondary groove $b^3$ formed in each of its sides, preparatory to performing the crushing operation on the distance piece. Fig. 17 shows the effect of the operation. By applying a crushing force to the head of the distance piece, the stalk will be shortened and bulged laterally causing the stringers $c\ c$ to be thrust partially into the grooves $b^3\ b^3$ a portion of the stringers being still retained in the notches of the shanks and the distance piece.

Figs. 18-23 show a development of the use of the stringer wherein it is caused to serve the purpose of determining the pitch of the blades or vanes as well as a spreader for the distance pieces. In these figures the shank of the blade or vane is perforated with an elongated hole $a^2$ adapted for the insertion of a stringer $c$ of like section in the under side of which uniformly spaced notches $c^1$ are provided (Fig. 23).

Fig. 19 which is a section along the line 19—19 of Fig. 22 shows the shank and stringer assembled, and Fig. 20 which is a section along 20—20 of Fig. 22 shows the bifurcated distance pieces inserted also.

Fig. 21 shows the fastening in the clenched position.

Some of the succeeding figures show another kind of stringer which is itself penetrated by the shanks of the guide-blades and vanes instead of these latter being penetrated by the stringer.

In Figs. 24-28 which represent the application of the device to re-action vanes, a stringer strip $c$ having a groove along its underside, as shown in section in Fig. 25, is notched on each side as shown in Fig. 26. By such means a plurality of short legs $c^2$ will be formed which, by means of a spreader represented by the rods $o$ in Fig. 27, are adapted to be distorted into the undercut sides of the groove $b$ and be clenched therein. The vane $a$ has a deep slotway cut in its shank whereby a prolonged bifurcation is provided, the legs $a^5\ a^5$ of which are adapted to be inserted within the side notches of $c$ and stand astride the strip. The vanes and the strip are simultaneously forced into the undercut groove and clenched therein as shown in Fig. 27.

In Figs. 29-33 a stringer strip $c$ of inverted channel section and of sufficient width is perforated with orifices of the shape and size of the section of the blade so that, after forming a foot $a^3$ by bending, the vane can be threaded through the orifice up to the foot. The groove is cut to a suitable section as shown in Fig. 29 with undercut auxiliary grooves $b^3\ b^3$. The strip with the assembled guide-blades or vanes is then inserted within the groove and by forcing the sides of the channel strip into the grooves $b^3\ b^3$, as shown in Fig. 30, the vanes will be held fast by their feet.

Various modifications in detail of the method of attachment by means of the stringer $c$ of channel section may be adopted as for example, the end of the vane may be enlarged by riveting and the orifice need not be capable of passing the entire section but only the thick portion of the section may be passed through and afterwards riveted.

Fig. 33 shows a further modification in which the shanks of the vanes are perforated, and an additional stringer $c^3$ consisting of a rod is passed through the holes after the vanes have been passed through the orifices in the stringer strip $c$. Blocks such as $r$ may be employed in combination with the two kinds of stringers, or they may be omitted.

In the example shown in Figs. 34-37 the shanks $a^1$ of the guide-blades or vanes having been bifurcated by the formation of a groove which extends in the direction of the width of the shank (Fig. 34), instead of in the direction of its thickness as in the previous examples, these shanks are inserted in slotways $c^4$ formed in a stringer strip $c$ of section as shown in Fig. 36. Along the under side of the strip a groove is formed leaving two sides $c^5\ c^5$ which are adapted to be clenched into two corresponding auxiliary grooves formed in the ring groove $b$. In the enlarged bottoms of the slotways $c^4$ a short spreading rod o is inserted, thus, by forcing the shanks into the strip and the strip into the groove, the blades or vanes will be secured by the clenching of a two way bifurcation.

We claim:

1. In a turbine, means for securing the guide-blades to the stator, consisting of shanks formed on said blades, a stringer to which said shanks are secured and an undercut groove in the stator in which said stringer and shanks are secured by deformation of one of said elements within said groove.

2. In a turbine, means for securing the vanes to the rotor, consisting of shanks formed on said vanes, a stringer to which said shanks are secured and an undercut groove in the rotor in which said stringer and shanks are secured by deformation of one of said elements within said groove.

3. In a turbine, means for securing the guide-blades to the stator, consisting of shanks formed on said blades, distance pieces separating said blades, a stringer to which said shanks are secured and an undercut groove in the stator in which said stringer, shanks and distance pieces are secured by deformation of one of said elements within said groove.

4. In a turbine, means for securing the vanes to the rotor consisting of shanks formed on said vanes, distance pieces separating said vanes, a stringer on which said shanks are secured and an undercut groove in the rotor in which said stringer, shanks and distance pieces are secured by deformation of one of said elements within said groove.

5. In a turbine, means for securing the guide-blades to the stator, consisting of shanks formed on said blades, each shank having an aperture, distance pieces separating said blades, a stringer rod inserted within the apertures in said shanks and an undercut groove in the stator in which said stringer rod, shanks and distance pieces are secured by deformation of the distance pieces within said groove.

6. In a turbine, means for securing the vanes to the rotor, consisting of shanks formed on said vanes, each shank having an aperture, distance pieces separating said vanes, a stringer rod inserted within the apertures in said shanks and an undercut groove in the rotor in which said stringer rod, shanks and distance pieces are secured by deformation of the distance pieces within said groove.

7. In a turbine, means for securing the guide-blades to the stator, consisting of shanks formed on said blades, each shank having an aperture, bifurcated distance pieces separating said blades, a stringer rod inserted within the apertures in said shanks and an undercut groove in the stator in which said stringer rod, shanks and distance pieces are secured by deformation of the bifurcated distance pieces within said groove.

8. In a turbine, means for securing the vanes to the rotor, consisting of shanks formed on said vanes, each shank having an aperture, bifurcated distance pieces separating said vanes, a stringer rod inserted within the apertures in said shanks and an undercut groove in the rotor in which said stringer rod, shanks and distance pieces are secured by deformation of the bifurcated distance pieces within said groove.

9. In a turbine, means for securing the guide-blades to the stator, consisting of shanks formed on said blades, each shank having an aperture and a tangential foot, distance pieces separating said blades, a stringer rod threaded through the apertures in said shanks and an undercut groove in the stator in which said stringer rod, shanks and distance pieces are secured by deformation of the distance pieces over said feet within said groove.

10. In a turbine, means for securing the vanes to the rotor, consisting of shanks formed on said vanes, each shank having an aperture and a tangential foot, distance pieces separating said vanes, a stringer rod threaded through the apertures in said shanks and an undercut groove in the rotor in which said stringer rod, shanks and distance pieces are secured by deformation of the distance pieces over said feet within said groove.

11. In a turbine, means for securing the guide-blades to the stator, consisting of shanks formed on said blades, each shank having an aperture and a tangential foot, bifurcated distance pieces separating said blades, a stringer rod threaded through the apertures in said shanks and an undercut groove in the stator in which said stringer rod, shanks and distance pieces are secured by deformation of the bifurcated distance pieces over said feet within said groove.

12. In a turbine, means for securing the vanes to the rotor, consisting of shanks formed on said vanes, each shank having an aperture and a tangential foot, bifurcated distance pieces separating said vanes, a stringer rod threaded through the apertures in said shanks and an undercut groove in the rotor in which said stringer rod, shanks and distance pieces are secured by deformation of the bifurcated distance pieces over said feet within said groove.

In testimony whereof we have signed our names to this specification in the presence of two subscribing witnesses.

ALEXANDER JUDE.
REGINALD KEBLE MORCOM.

Witnesses:
ERNEST HARKER,
FREDERICK JOHN KINCHIN.